April 30, 1968     D. SCARAMUCCI     3,380,706

BALL VALVE WITH REINFORCED SEALS

Filed June 21, 1965     2 Sheets-Sheet 1

INVENTOR.
DOMER SCARAMUCCI
BY
Dunlap and Laney
ATTORNEYS

INVENTOR.
DOMER SCARAMUCCI

United States Patent Office 3,380,706
Patented Apr. 30, 1968

3,380,706
BALL VALVE WITH REINFORCED SEALS
Domer Scaramucci, Oklahoma City, Okla., assignor to Balon Corporation, Oklahoma City, Okla., a corporation of Oklahoma
Filed June 21, 1965, Ser. No. 465,529
14 Claims. (Cl. 251—148)

ABSTRACT OF THE DISCLOSURE

A ball valve of the floating ball type including a downstream seal comprising an elastic material portion clamped between the valve body and a downstream connector and extending radially inwardly into the valve chamber engaging the ball to provide a primary seal, and a reinforcing ring bonded to the downstream end of the elastic seal ring in a position to engage the downstream connector and provide a secondary, metal-to-metal seal against the ball in the event of destruction of the primary seal.

This invention relates generally to improvements in ball valves, and more particularly, but not by way of limitation, to improved seals particularly suited for use in ball valves.

As it is well known in the art, ball valves are normally provided with both upstream and downstream seals to prevent leakage around the valve ball when the valve is closed. Such seals are normally formed of an elastic material, such as rubber, a rubber compound or a synthetic resin material. Such seals are, of course, subject to wear and are required to be replaced at periodic intervals. However, such elastic material seals are also subject to destruction when exposed to high heat, such as when the valve is close to a fire, and upon such destruction, the prior elastic material seals are ineffective and do not prevent leakage through the valves in which they are used. Metal-to-metal seals or seats are much more fireproof, but in the past have required maintaining extremely close tolerances in the manufacturing of the valves and have thus not been used nearly as much as the elastic material seals.

The present invention contemplates a novel ball valve construction utilizing novel sealing ring assemblies wherein the valve ball is normally sealed with the use of elastic material to form both high and low pressure seals and wherein the ball is sealed by a metal-to-metal sealing arrangement, at least at the downstream end of the valve, in the event of excessive wear or destruction of the elastic material of the sealing ring assemblies. In one aspect, the present invention contemplates a novel sealing ring assembly having inner and outer elastic material portions to normally provide a seal between a valve ball and valve body and accommodate upstream and downstream movement of the valve ball. The sealing ring assembly further utilizes a reinforcing ring of rigid material having a ball-engaging surface spaced from the ball-engaging surface of the elastic material portion of the sealing ring positioned to engage the valve ball and provide a secondary seal in the event of excessive wear or destruction of the elastic material ball-engaging surface of the sealing ring.

An object of this invention is to provide a fireproof ball valve construction.

Another object of this invention is to provide a ball valve wherein the valve ball will be effectively sealed in the valve body when in a closed position, even when the downstream seal is excessively worn or partially destroyed.

Another object of this invention is to provide a ball valve construction having both upstream and downstream seals effective in both high and low pressure service and wherein the valve ball will be effectively sealed in the event the seals are damaged by fire or the like.

A further object of this invention is to provide a ball valve sealing ring assembly which will flex to follow changes in position of a valve ball and which provides both primary and secondary seals.

Another object of this invention is to provide a ball valve sealing ring which provides a primary elastic material seal and a secondary metal-to-metal seal.

A still further object of this invention is to provide a ball valve sealing ring assembly incorporating an elastic material primary seal and a metal or other rigid material secondary seal and yet wherein the assembly may be molded in a single molding operation.

Another object of this invention is to provide a ball valve which is simple in construction, which will have a long service life and which may be economically manufactured and repaired.

Other objects and advantages of the invention will be evident from the following detailed description when read in conjunction with the accompanying drawings which illustrate the invention.

Figure 1:
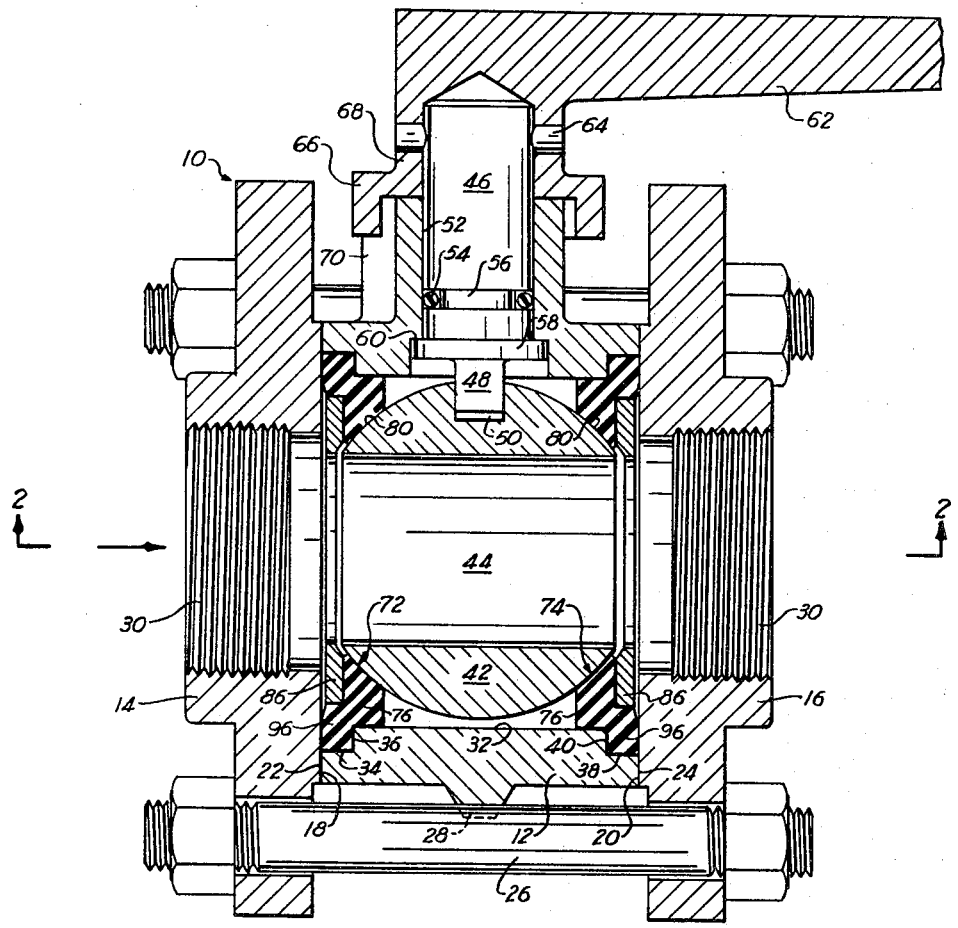
FIG. 1 is a vertical sectional view through a ball valve constructed in accordance with this invention.

Referring to the drawings in detail, and particularly FIG. 1, reference character 10 generally designates a ball valve which includes a valve body 12 and tubular connectors 14 and 16 at the opposite ends of the valve body. The upstream end 18 and downstream end 20 of the valve body 22 are shaped substantially flat to mate with the flat inner ends 22 and 24 of the connectors 14 and 16, respectively. The connectors 14 and 16 are rigidly secured against the respective upstream and downstream ends of the valve body 12 by means of a plurality of circumferentially spaced bolts 26. As indicated in dashed lines in FIG. 1, each bolt 26 may be extended through a groove or slot 28 formed in the outer periphery of the valve body 12 to facilitate the centering of the connectors 14 and 16 with respect to the body 12 during the assembly operation. Each of the connectors 14 and 16 is illustrated in FIG. 1 as being a standard pipe flange having a partially threaded bore 30 therethrough. The threaded bores 30 are provided for connection of adjacent sections of a pipe line (not shown) and form the inlet and outlet for the valve 10.

The valve body 12 is provided with a bore 32 extending between the upstream and downstream ends 18 and 20 which forms the usual valve chamber. A counterbore 34 is formed in the upstream end 18 of the body 12 concentrically around the valve chamber 32 and forms a circumferential shoulder 36 in spaced relation from the body end 18 and facing upstream. A similar counterbore 38 is formed in the downstream end 20 of the valve body 12 concentrically around the valve chamber 32 and forms a circumferential shoulder 40 spaced from the downstream body end 20 and facing downstream for purposes to be described.

A valve ball 42, having the usual port 44 therethrough, is positioned in the valve chamber 32 and is turned between opened and closed positions by a valve stem 46. The inner end 48 of the valve stem 46 is rectangular in cross section and slidingly fits in a mating groove 50 formed in the outer surface of the ball 42. As shown by the dashed lines in FIG. 2, the groove 50 has a length greater than the transverse length of the valve stem end 48, whereby the ball 42 may be moved downstream in the valve chamber 32 when the valve ball is in a closed position, as will be more fully hereinafter set forth. The valve stem 46 extends through an aperture 52 formed in the top of a valve body 12 and is sealed in the aperture 52 by means of a sealing ring 54 mounted in a mating groove 56 in the outer surface of the valve stem. A circumferential flange 58 is formed around the valve stem 46 in the valve chamber 32 and mates with a flat surface 60 formed in the valve chamber to prevent inadvertent removal of the valve stem 46. A handle 62 is secured to the outer end of the valve stem 46 by pins 64 or the like for manual turning of the valve stem 46 and ball 42. Preferably, one or more lugs 66 are formed on the handle hub 68 and are positioned to engage lugs 70 on the valve body 12 to limit the turning movement of the ball 42 to 90° in the usual way.

An upstream sealing ring assembly 72 is clamped between the tubular connector 14 and the valve body 12, and a downstream sealing ring assembly 74 is clamped between the tubular connector 16 and the valve body 12. The sealing ring assemblies 72 and 74 are constructed in the same manner, so it will only be necessary to describe the construction of the downstream sealing ring assembly 74 in detail, and, for that purpose, reference is made to FIG. 3 wherein the sealing ring assembly 74 is illustrated in an unstressed condition.

The sealing ring assembly 74 comprises an annular shaped inner portion 76 of elastic material having an outer periphery 78 of a size to slidingly fit in the respective end of the valve chamber 32 when the elastic material is in an unstressed condition. A ball-engaging surface 80 is formed on the portion 76 between the inner end 82 thereof and the inner periphery 84 thereof to sealingly engage the adjacent surface of the ball 42. In this form of the invention, the ball-engaging surface 80 is curved to conform to the curvature of the outer surface of the ball 42 to sealingly engage the ball throughout the length of the ball-engaging surface.

A reinforcing ring 86 of a rigid material, such as metal, is bonded in a mating groove 88 in the outer end face 90 of the elastic body portion 76. The inner diameter of the reinforcing ring 86 is less than the inner diameter of the elastic body portion 76, and a ball-engaging surface 92 is formed on the reinforcing ring 86 between the inner end thereof and the inner periphery thereof. The ball-engaging surface 92 is positioned to be spaced from the ball 42 when the ball-engaging surface 80 is in engagement with the ball and in an unworn condition. Thus, a space or pocket 94 is normally provided between the ball 42, the inner periphery 84 of the elastic material portion 76 and the ball-engaging surface 92 to trap foreign material which may tend to cling to the outer surface of the ball 42 and be scraped off by the elastic material body portion 76 at the intersection between the ball-engaging surface 80 and inner periphery 84.

The sealing ring assembly 74 also includes an outer or flange portion 96 of elastic material extending radially outward from the inner portion 76 into the counterbore 38. The inner end 98 of the flange portion 96 is substantially flat to mate with the body shoulder 40 and the outer periphery of the flange portion 96, in the relaxed condition of the sealing ring assembly, slidingly fits in the counterbore 38. An annular bead 100 is formed on the outer end of the flange portion 96 directly opposite the body shoulder 40. In the relaxed condition of the flange 96 the total axial length of the flange, including the annular bead 100, is greater than the depth of the counterbore 38, such that at least a portion of the bead 100 will project beyond the end 20 of the body 12. Thus, when the tubular connector 16 is bolted against the downstream end 20 of the body, at least a portion of the bead 100 will be distorted into the flange portion 96 and inner portion 76, and the flange 96 will provide an effective seal between the valve body 12 and the tubular connector 16. In this form of sealing ring assembly, it should also be noted that the outer end 90 of the inner body portion 76 and the downstream or outer end 102 of the reinforcing ring 86 are spaced a slight distance inwardly of the downstream end 20 of the body 12.

Figure 3:
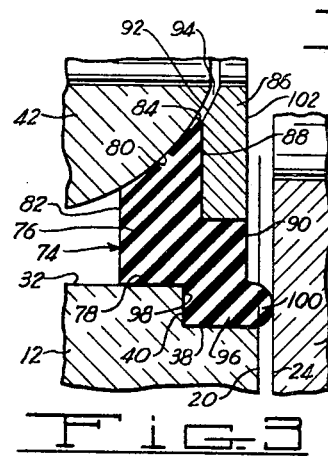
FIG. 3 is an enlarged, partial, cross-sectional view through the downstream sealing ring assembly used in the valve shown in FIGS. 1 and 2 illustrating the sealing ring assembly in a relaxed condition.

As previously stated, the inner and outer portions 76 and 96 of the sealing ring assembly 74 are formed of an elastic material and are shown in FIG. 3 as being of a common rubber material. Such elastic material may be a rubber composition, preferably having a durometer of about 80 to 90, or such elastic material may be a synthetic resin such as nylon, Teflon or Delrin. The reinforcing ring 86 may be easily molded to the elastic material during the molding of the elastic material into the configuration shown in FIG. 3 to provide an economical manufacturing operation.

As also previously indicated, the sealing ring assemblies 72 and 74 are constructed in the same manner and are simply arranged in opposite hand positions in the valve 10. The outer or flange portion 96 of the upstream sealing ring assembly 72 extends into the counterbore 34 and is clamped therein by the upstream tubular connector 14 as illustrated in both FIGS. 1 and 2.

Figure 2:
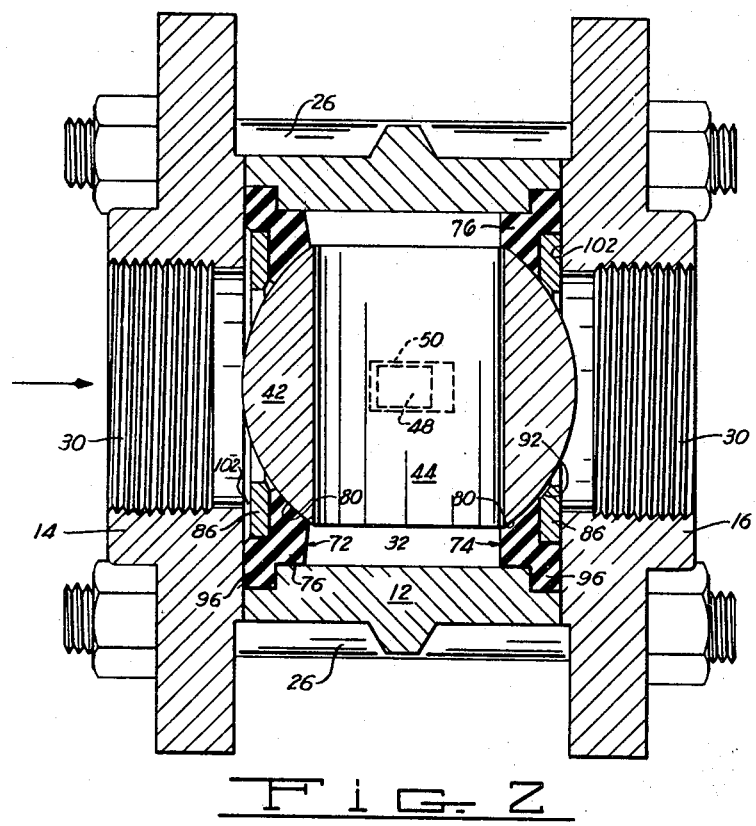
FIG. 2 is a horizontal cross-sectional view of the valve of FIG. 1 as taken along lines 2—2 of FIG. 1 illustrating the valve in a closed position and with a pressure differential existing across the valve.

With the valve 10 in an open position as illustrated in FIG. 1, the valve ball 42 will be centered in the valve chamber 32 and the elastic material ball-engaging surfaces 80 of both the upstream and downstream sealing ring assemblies will be in engagement with the adjacent outer surfaces of the ball 42. When the ball 42 is turned to a closed position as shown in FIG. 2, and when a substantial pressure differential exists across the valve, the valve ball 42 will be moved a short distance downstream by the action of the upstream fluid pressure. The inner elastic portion 76 and reinforcing ring 86 of the downstream sealing ring assembly will thus also be forced downstream a short distance until the outer end 102 of the reinforcing ring 86 engages the tubular connector 16 as illustrated on the right hand side of FIG. 2. The elastic material ball-engaging surface 80 of the downstream sealing ring assembly will thus remain in sealing engagement with the ball 42 and provide an effective downstream seal.

When the ball 42 is moved downstream as indicated above, the pressure of the fluid in the upstream end of the valve also acts on the outer end 102 of the reinforcing ring 86 and the outer end 90 of the elastic portion 76 of the upstream sealing ring assembly 72 to move this elastic portion 76 and reinforcing ring 86 downstream with the valve ball and retain the ball-engaging surface 80 in sealing engagement with the ball. Thus, the upstream sealing ring assembly 72 remains effective as an upstream seal for the valve 10.

When the ball-engaging surface 80 of the downstream sealing ring assembly 74 becomes worn or is even partially destroyed by heat, the pressure differential across the valve will move the ball 42 on further downstream into engagement with the ball-engaging surface 92 of the reinforcing ring 86 of the downstream sealing ring assembly 74. The ball 42 will then still be sealed at the downstream end of the valve chamber by a metal-to-metal seal. Normally, when the ball-engaging surface 80 of the downstream sealing ring assembly 74 becomes worn or damaged, the sealing ring assembly will be replaced, and the ball-engaging surface 92 will be relied upon only as a temporary, secondary seal until the sealing ring assembly can be replaced. Further, it will be apparent that such replacement of a sealing ring assembly merely requires the removal of the respective connector 14 or 16 and the replacement of the worn sealing ring assembly.

Figure 4:
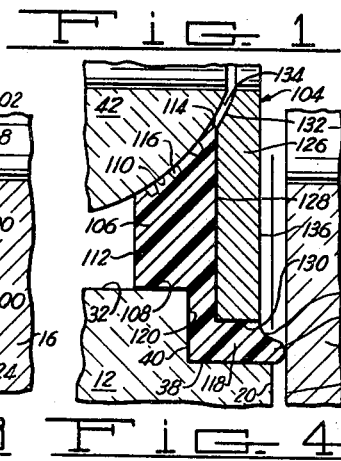
FIG. 4 is a view similar to FIG. 3 but illustrating a modified sealing ring assembly.

A modified sealing ring assembly 104 for the valve 10 is illustrated in FIG. 4 in its relaxed condition. Although the sealing ring assembly 104 is illustrated as being a downstream seal, it will be understood that a similar sealing ring assembly could be used in the upstream end of the valve, if desired. The sealing ring assembly 104 comprises an annular elastic material inner portion 106 having its outer periphery 108 sized to slidingly fit in the respective end of the valve chamber 32 when the portion 106 is in a relaxed condition. A ball-engaging surface 110 is formed on the portion 106 between the inner end 112 and inner periphery 114 thereof. The ball-engaging surface 110 is shaped to mate with the outer surface of the ball 42 and is provided with a plurality of annular grooves 116 therein to enhance the sealing action of the ball-engaging surface 110.

The sealing ring assembly 104 also includes an outer or flange portion 118 of elastic material extending radially outward from the portion 106 into the counterbore 38. The inner end 120 of the portion 118 is flat to mate with the shoulder 40 and the outer periphery of the portion 118 is sized to slidingly fit in the counterbore 38 in the relaxed condition of the sealing ring assembly. An annular bead 122 is formed on the outer end 124 of the portion 118 and the overall axial length of the portion 118, including the bead 122, is greater than the depth of the counterbore 38. Thus, at least a portion of the bead 122 projects beyond the end face 20 of the body 12 for distortion by the connector 16 when the connector is rigidly secured to the body 12. Therefore, the portion 118 provides an effective seal between the body 12 and the connector 16 when the valve in which the sealing ring assembly is installed in a pipe line.

The sealing ring assembly 104 further includes a reinforcing ring 126 of a rigid material, such as metal, bonded to the outer end 128 of the elastic material inner portion 106 and to a circumferential shoulder 130 formed on the elastic material outer portion 118. A ball-engaging surface 132 is formed on the reinforcing ring 126 between the inner end thereof and the inner periphery thereof. It will also be noted in FIG. 4 that the reinforcing ring ball-engaging surface 132 is spaced from the ball 42 when the elastic material ball-engaging surface 110 is in good condition and in engagement with the ball. Thus, a space or pocket 134 is formed between the ball 42, the inner periphery 114 of the elastic material inner portion 106 and the reinforcing ring ball-engaging surface 132 to trap foreign matter tending to cling to the outer surface of the ball. It may also be noted in FIG. 4 that the outer end 136 of the reinforcing ring 126 is spaced inwardly from the end 20 of the valve body 12 so as not to interfere with the clamping of the elastic material portion 118 between the body 12 and the connector 16.

The elastic material in the inner portion 106 and the outer portion 118 may be formed of any desired material, as previously described for the sealing ring assembly 74, and are illustrated as a one-piece body of synthetic resin material in FIG. 4.

The sealing ring assembly 104 operates in the same manner as the previously described sealing ring assembly 74 when used as a downstream seal, and operates in the same manner as the previously described sealing ring assembly 72 when used as an upstream seal.

Figure 5:
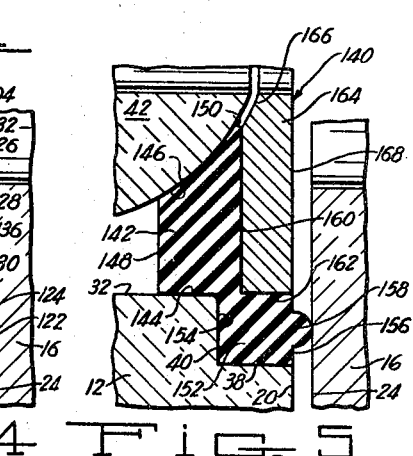
FIG. 5 is another view similar to FIG. 3 illustrating still another modified sealing ring assembly.

Another modified sealing ring assembly 140 for the valve 10 is illustrated in FIG. 5 in its relaxed or unstressed condition. Here again it should be understood that although the sealing ring assembly 140 is illustrated as a downstream seal, the same construction may be used for an upstream seal. The sealing ring assembly 140 includes an inner portion 142 of elastic material having an outer periphery 144 of a size to provide a sliding fit thereof in the valve chamber 32 in the unstressed condition of the sealing ring. A ball-engaging surface 146 is formed on the portion 142 between the inner end 148 thereof and the inner periphery 150 thereof. The ball-engaging surface 146 is shaped to mate with the adjacent surface of the ball 42 and may, if desired, be provided with a plurality of annular grooves (not shown).

The sealing ring assembly 140 also includes an outer or flange portion 152 of elastic material extending radially outward from the portion 142 into the counterbore 38. The inner end 154 of the flange portion 152 is substantially flat to mate with the body shoulder 40, and the outer periphery of the flange portion 152 is sized to slidingly fit in the counterbore 38 in the unstressed condition of the sealing ring assembly. The outer end 156 of the flange portion 152 is substantially coterminous with the end 20 of the body 12, but is provided with an annular bead 158 which projects beyond the body end face 20. Thus, when the connector 16 is bolted against the end 20 of the body 12, the material in the annular bead 158 will be displaced into the flange portion 152 and into the body portion 142, whereby the flange portion 152 provides an effective seal between the valve body 12 and the connector 16.

The flange portion 152 is projected beyond the outer end 160 of the elastic body portion 142 to provide an inwardly facing circumferential shoulder 162 on the flange portion 152, whereby a reinforcing ring 164 may be molded to both the inner and outer elastic material portions 142 and 152. The reinforcing ring 164 is formed of a relatively rigid material, such as metal and has an inner diameter less than the inner diameter of the elastic material portion 142. A ball-engaging surface 166 is provided on the reinforcing ring 164 between the inner end and inner periphery thereof in a position to be spaced from the ball 42 when the elastic material ball-engaging surface 146 is in contact with the ball.

In the embodiment of sealing ring assembly illustrated at 140 in FIG. 5, the outer end 168 of the reinforcing ring 164 is arranged substantially even with the end 20 of the valve body 12, but is spaced upstream from the outer end of the annular bead 158. Thus, the reinforcing ring 164 will not interfere with the clamping of the flange portion 152 in the counterbore 38 by the bolting of the connector 16 to the valve body, but will be in contact with the connector 16 when the connector is secured as stated. Thus, the reinforcing ring 164 will not be moved downstream when the ball 42 is moved to a closed position and the sealing ring assembly 140 is used as a downstream seal. Therefore, any downstream movement of the ball 42 will merely tend to deform the elastic material ball-engaging surface 146, but the sealing ring assembly 140 will remain effective as a downstream seal. When used as an upstream seal, the assembly 140 will be effective as an upstream sealer in all operating positions of the ball 42 in the same manner as previously described in connection with the upstream sealing ring assembly 72.

In use of the sealing ring assembly 140 as a downstream seal, the rigid ball-engaging surface 166 will act as a secondary seal in the event of wear or destruction of the elastic material ball-engaging surface 146 in the same manner as previously described in connection with the sealing ring assembly 74. The elastic material portions 142 and 152 may be formed of the same elastic materials previously mentioned and are illustrated in FIG. 5 as being portions of a one-piece, annular-shaped, rubber composition.

Figure 6:
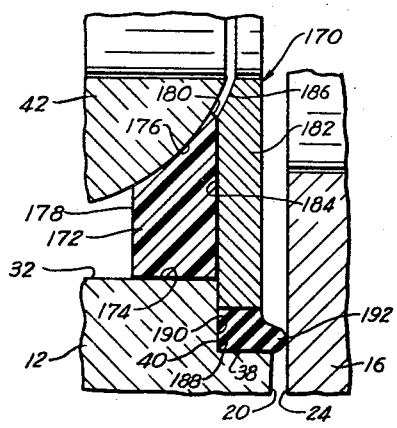
FIG. 6 is a further view similar to FIG. 3 illustrating another form of sealing ring assembly.

Another modified sealing ring assembly 170 for the valve 10 is illustrated in FIG. 6 in its relaxed or unstressed condition. The sealing ring assembly 170 is illustrated in the position of a downstream seal, but here again, the same construction can be used for an upstream seal. The sealing ring assembly 170 comprises an inner elastic material portion 172 having an outer periphery 174 of a size to provide a sliding fit thereof in the respective end of the valve chamber 32 in the relaxed condition of the sealing ring assembly. A ball-engaging surface 176 is formed on the elastic portion 172 between the inner end 178 and inner periphery 180 thereof. The ball-engaging surface 176 is shaped to mate with the adjacent surface of the ball 42 and sealingly engage the ball 42 throughout the length of the ball-engaging surface. In this form of the invention, the elastic material portion 172 is preferably a synthetic resin material, such as nylon, Teflon or Delrin, and a plurality of annular grooves (not shown) may be provided in the ball engaging surface 176 if desired.

A reinforcing ring 182 of relatively rigid material, such as metal, is bonded to the outer end 184 of the elastic material portion 172, and the outer diameter of the reinforcing ring 182 is greater than the diameter of the valve chamber 32, but less than the diameter of the counterbore 38. Therefore, when the sealing ring assembly 170 is installed in the valve 10, the reinforcing ring 182 is pushed into the valve into contact with the body shoulder 40 as illustrated in FIG. 6. In this position of the sealing ring assembly, the elastic material ball-engaging surface 176 is positioned to engage the ball 42 when the ball 42 is centered in the valve chamber 32. A ball-engaging surface 186 is formed on the reinforcing ring 182 between the inner end and inner periphery thereof and is normally spaced from the ball 42 when the elastic material ball-engaging surface 176 is in good operating condition.

The sealing ring assembly 170 further includes an outer elastic material portion 188 in the form of a ring bonded around the outer periphery of the reinforcing ring 182 for positioning in the counterbore 38. The inner end 190 of the elastic material portion 188 is flat and even with the inner end of the reinforcing ring 182 to abut the body shoulder 40. The outer periphery of the elastic material portion 188 is sized to provide a sliding fit thereof in the counterbore 38 in the relaxed condition of the sealing ring assembly. The total axial length of the elastic material portion 188 is greater than the axial thickness of the reinforcing ring 182 and slightly greater than the depth of the counterbore 38, whereby the outer end portion 192 thereof protrudes beyond the end face 20 of the body 12. Thus, when the connector 16 is bolted to the body 12, the elastic material of the portion 188 is placed under a state of compression and distorted to provide an effective seal between the valve body 12 and the connector 16. In this embodiment of the invention, the portion 188 is preferably formed of a rubber composition which is easily deformed by the connector 16 and thus preferably has a durometer of below 80.

The sealing ring assembly 170 operates in the same manner as the sealing ring assembly 74 previously described when used as a downstream seal in the valve 10. That is, the elastic material ball-engaging surface 176 remains in sealing engagement with the ball 42 in all operating positions of the ball until such surface becomes worn or destroyed; whereupon the rigid ball-engaging surface 186 comes into contact with the ball 42 and provides a secondary seal until the replacement of the sealing ring assembly. When used as an upstream seal, the sealing ring assembly 170 functions in the same manner as the sealing ring assembly 72 previously described.

Figure 7:
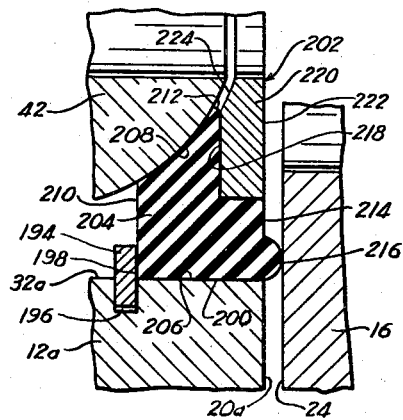
FIG. 7 is a view similar to FIG. 3 illustrating a slightly modified valve body construction and sealing ring assembly.

FIG. 7 illustrates a portion of the downstream end of a modified valve body 12a to illustrate a construction which may be used when the walls of the valve body are not sufficiently thick for the provision of counterbores in the opposite ends thereof. In this construction, a snap-ring 194 is installed in a mating groove 196 formed in the walls of the valve chamber 32a a short distance from the downstream end 20a of the body 12a. The snap-ring 194 protrudes into the valve chamber 32a and thus forms a circumferential shoulder 198 in spaced relation from the end 20a of the valve body and facing downstream. This construction also divides the valve chamber 32a into what may be considered a cylindrical wall portion 200 between the shoulder 198 and the body end 20a. It will thus be seen that the cylindrical wall 200 takes the place of the counterbores previously described (such counterbores may be considered as cylindrical walls) and the shoulder 198 formed by the snap-ring 194 is the equivalent of the bottom of a counterbore in the respective end of the valve chamber. It will also be understood that the same construction may be used at the opposite end of the modified valve body 12a for accommodation of the upstream sealing ring assembly.

A slightly modified sealing ring assembly 202 is utilized in the modified valve body 12a, either as an upstream or downstream seal or as both upstream and downstream seals. As shown in FIG. 7 in the position of a downstream seal, the sealing ring assembly 202 comprises a body 204 of elastic material having an outer periphery 206 of a size to provide a sliding fit thereof in the cylindrical wall 200 in the relaxed condition of the sealing ring assembly. A ball-engaging surface 208 is formed between the inner end 210 and inner periphery 212 of the elastic body 204 for sealingly engaging the valve ball 42. The body 204 is of an axial length substantially corresponding to the distance between the circumferential shoulder 198 and the body end 20a, such that the outer end 214 of the body 204 is substantially even with the valve body end 20a when the assembly 202 is installed in the valve chamber 32a against the circumferential shoulder 198. An annular bead 216 is formed on the outer end 214 of the body 204 coterminous with the outer periphery 206 of the body 204 to project beyond the valve body end face 20a. Thus, when the connector 16 is bolted against the body 12a, the elastic material in the radially outer portion of the body 204 is placed under a state of compression and distorted to provide an effective seal between the shoulder 198 and the connector 16.

An annular groove 218 is formed in the outer end 214 of the elastic material body 204 to receive a rigid reinforcing ring 220 of metal or the like. The reinforcing ring 220 is bonded to the walls of the groove 218 and projects radially inward beyond the inner periphery 212 of the body 204. However, the outer end 222 of the ring 220 is arranged substantially even with the outer end 214 of the body 204. A ball-engaging surface 224 is formed on the reinforcing ring 220 between the inner end and inner periphery thereof. Here again, the rigid ball-engaging surface 224 is spaced from the ball 42 when the elastic material ball-engaging surface 208 is not worn or destroyed to provide a secondary seal.

In the sealing ring assembly 202 it is thus seen that a single annular body of elastic material is used, and such material may be rubber, a rubber composition or a synthetic resin material of the types previously described. The sealing ring assembly 202 operates in the same manner as the sealing ring assembly 140 previously described.

From the foregoing it will be apparent that the present invention provides a fire-proof ball valve construction. The novel sealing ring assemblies of this invention provide effective upstream and downstream seals which may be used in either high or low pressure service. When used as a downstream seal, the sealing ring assembly is particularly effective in providing a secondary metal-to-metal seal in the event of excessive wear or damage to the elastic material portions of the assembly to materially increase the safety of operation of the valve in which the assembly is used. It will also be apparent that the valve of this invention may be easily repaired by merely removing the connectors from the opposite ends of the body. It is unnecessary to disturb the position of the valve ball when it is desired simply to replace the seals.

Changes may be made in the combination and arrangement of parts or elements as heretofore set forth in the specification and shown in the drawings, it being understood that changes may be made in the embodiments disclosed without departing from the spirit and scope of the invention as defined in the following claims.

What is claimed is:

1. A ball valve, comprising:
    a body having upstream and downstream ends, a valve chamber therein between said upstream and downstream ends, a circumferential shoulder in the valve chamber adjacent the downstream end of the body and facing downstream, and a cylindrical wall extending from said shoulder toward the downstream end of the body;
    a valve ball mounted in the valve chamber for opening and closing movements and for movement in the valve chamber toward the downstream end of the body when in a closed position;
    a tubular pipe connector adapted to be secured to the downstream end of the body having an inner end to be positioned in alignment with said shoulder and having an inner diameter less than the diameter of the valve chamber;
    an elastic material sealing ring in the valve chamber having an outer portion thereof extending radially outward against said cylindrical wall between said shoulder and the downstream end of the body, said outer portion having an axial thickness, in the relaxed condition thereof, greater than the distance between said shoulder and the inner end of the connector when the connector is secured to the downstream end of the valve body whereby said outer portion is distorted into sealing engagement with said shoulder and the connector when the connector is secured to the valve body, said sealing ring also having an inner portion extending radially inward in the valve chamber and having a ball-engaging surface thereon between the upstream end thereof and the inner periphery thereof to sealingly engage the ball; and
    a reinforcing ring of rigid material secured to the sealing ring between said inner portion and the inner end of the connector having an outer diameter greater than the inner diameter of the connector and positioned to engage the connector upon downstream movement of the ball, the downstream end of said reinforcing ring being spaced upstream from the downstream end of the sealing ring outer portion in the relaxed condition of said outer portion, said reinforcing ring also having a ball-engaging surface between the upstream end and inner periphery thereof spaced downstream from the ball a distance less than the total possible downstream movement of the ball when the sealing ring inner portion engages the ball to provide a secondary seal in the event of destruction or wear of said sealing ring inner portion.

2. A ball valve as defined in claim 1 wherein the inner diameter of said reinforcing ring is less than the inner diameter of said sealing ring to form an annular space between the ball and the ball-engaging surface of the reinforcing ring when the sealing ring engages the ball to trap foreign matter removed from the outer surface of the ball.

3. A ball valve as defined in claim 1 wherein the reinforcing ring is positioned in spaced relation from the inner end of the connector, when the connector is secured to the body, a distance less than the total possible downstream movement of the ball.

4. A ball valve as defined in claim 1 wherein said shoulder is formed by a snap ring secured in a mating groove in the valve chamber.

5. A ball valve as defined in claim 1 wherein said sealing ring is a rubber composition having a durometer of from about 80 to 90.

6. A ball valve as defined in claim 1 wherein said sealing ring is a synthetic resin material.

7. A ball valve as defined in claim 1 wherein said sealing ring is a single body of elastic material.

8. A ball valve as defined in claim 1 wherein said sealing ring inner portion is separate from said sealing ring outer portion, both said portions are bonded to the reinforcing ring, and the outer diameter of the reinforcing ring is between the diameter of said cylindrical wall and the inner diameter of said shoulder whereby the reinforcing ring seats against said shoulder.

9. A ball valve as defined in claim 8 wherein said sealing ring outer portion is a rubber composition.

10. A ball valve as defined in claim 9 wherein said sealing ring inner portion is a synthetic resin material.

11. A ball valve as defined in claim 1 wherein said sealing ring ball-engaging surface is shaped to conform to the outer surface of the ball.

12. A ball valve as defined in claim 11 wherein said sealing ring ball-engaging surface has a plurality of annular grooves therein.

13. A ball valve, comprising:
    a body having upstream and downstream ends, a valve chamber therein extending between said ends, and a counterbore in the downstream end portion of the valve chamber forming a circumferential shoulder in the valve chamber facing downstream;
    a valve ball mounted in the valve chamber for opening and closing movements and for movement in the valve chamber toward the downstream end of the body when in a closed position;
    a tubular pipe connector adapted to be secured to the downstream end of the body having an inner end to be positioned in alignment with said shoulder and having an inner diameter less than the diameter of the valve chamber;
    an elastic material sealing ring assembly including:
        an elastic material inner portion slidingly fitting in the valve chamber adjacent said counterbore extending radially inward toward the ball and having a ball-engaging surface thereon between the upstream end and inner periphery thereof which is subject to wear, and an elastic material outer portion positioned in said counterbore and sized to be clamped between said shoulder and the inner end of the connector; and
        a rigid material reinforcing ring bonded to the downstream end of said inner portion having an outer diameter greater than the inner diameter of the connector and positioned to engage the connector upon downstream movement of the ball, the downstream face of said reinforcing ring being spaced upstream from the downstream end of said outer portion in the relaxed condition of said outer portion, and said reinforcing ring having a ball-engaging surface thereon between the upstream face and inner periphery thereof positioned radially inward of the ball-engaging surface of said inner portion and spaced downstream from the ball, when the ball-engaging surface of said inner portion is not worn, a distance less than the total possible downstream movement of the ball.

14. A ball valve, comprising:
    a body having upstream and downstream ends, a valve chamber therein extending between said ends, and a counterbore in each end of the valve chamber forming a circumferential shoulder in the upstream end of the valve chamber facing upstream and a circumferential shoulder in the downstream end of the valve chamber facing downstream;
    a valve ball mounted in the valve chamber for opening and closing movements and for movement in the valve chamber toward the downstream end of the body when in a closed position;
    a pair of tubular pipe connectors adapted to be secured to the upstream and downstream ends of the body, each of said connectors having an inner end to be positioned in alignment with the respective shoulder and having an inner diameter less than the diameter of the respective counterbore;

an elastic material sealing ring in each end portion of the valve chamber, each sealing ring having a circumferential flange on the outer periphery thereof extending into the respective counterbore and sized to be clamped between the respective shoulder and inner end of the respective connector when the respective connector is secured to the respective end of the body, each sealing ring also having a ball-engaging surface thereon between the inner end and inner periphery thereof which is subject to wear; and a reinforcing ring of rigid material bonded to the outer end of each sealing ring radially inward of the respective sealing ring flange having an outer diameter greater than the inner diameter of the respective connector and positioned to engage the respective connector upon deflection of the respective sealing ring toward the respective connector, each reinforcing ring having a ball-engaging surface thereon spaced from the ball by the respective sealing ring when the ball-engaging surface of the sealing ring is not worn.

References Cited

UNITED STATES PATENTS

| | | | |
|---|---|---|---|
| 1,679,779 | 8/1928 | Oberhuber | 277—207 X |
| 2,732,170 | 1/1956 | Shand | 251—172 |
| 2,768,643 | 10/1956 | Acomb | 137—505.42 |
| 2,837,308 | 6/1958 | Shand | 251—315 X |
| 3,177,887 | 4/1965 | Priese | 251—315 X |
| 3,235,224 | 2/1966 | Grove | 251—315 X |
| 3,244,398 | 4/1966 | Scaramucci | 251—317 X |

FOREIGN PATENTS

| | | |
|---|---|---|
| 595,562 | 7/1959 | Italy. |

WILLIAM F. O'DEA, *Primary Examiner.*

H. W. WEAKLEY, *Assistant Examiner.*